United States Patent
Smith et al.

[15] 3,685,604
[45] Aug. 22, 1972

[54] BALANCED MASS-MOMENT BALANCE BEAM WITH ELECTRICALLY CONDUCTIVE PIVOTS

[72] Inventors: James E. Smith; Victor F. Borgogno, both of Longmont, Colo.

[73] Assignee: Wm. Ainsworth Inc., Denver, Colo.

[22] Filed: Sept. 28, 1970

[21] Appl. No.: 75,987

[52] U.S. Cl. ................. 177/184, 177/210, 177/246, 177/DIG. 9
[51] Int. Cl. ......................... G01g 21/10, G01g 3/14
[58] Field of Search...... 177/184, 190, 194, 210, 246, 177/DIG. 9

[56] References Cited

UNITED STATES PATENTS

| | | | |
|---|---|---|---|
| 2,832,535 | 4/1958 | Sherman | 177/210 X |
| R27,056 | 2/1971 | Connors | 177/225 X |
| 2,631,027 | 3/1953 | Payne | 177/210 |
| 2,734,736 | 2/1956 | Payne | 177/210 |
| 3,347,328 | 10/1967 | Schieser et al. | 177/184 X |

*Primary Examiner*—Stephen J. Tomsky
*Assistant Examiner*—George H. Miller, Jr.
*Attorney*—Reilly and Lewis

[57] ABSTRACT

A pivotally mounted balance beam is constructed and arranged to nullify its pendular characteristics by appropriately distributing and balancing the moments of the mass both parallel and perpendicular to the beam plane so that whenever the beam reference plane is tilted out of the horizontal any weighing errors resulting from tilt and vibration of the frame of the weigh balance apparatus are minimized. In forming a part of the weigh balance apparatus, a circuit generates an output proportional to load as a function of beam deflection sensed by capacitive sensors and operates through an electromagnetic restoring device including a beam mounted forcer coil to restore the beam to its null position. The coil is connected through electrically conductive knife edges and bearing flats to receive the circuit output and has its position relative to the magnet of the restoring device set so that the restoring device has a linear response to the circuit output. A display receives the circuit output and is compensated for errors caused by changes in the response of the restoring device as a function of its operating temperature to provide a readout representing load.

15 Claims, 4 Drawing Figures

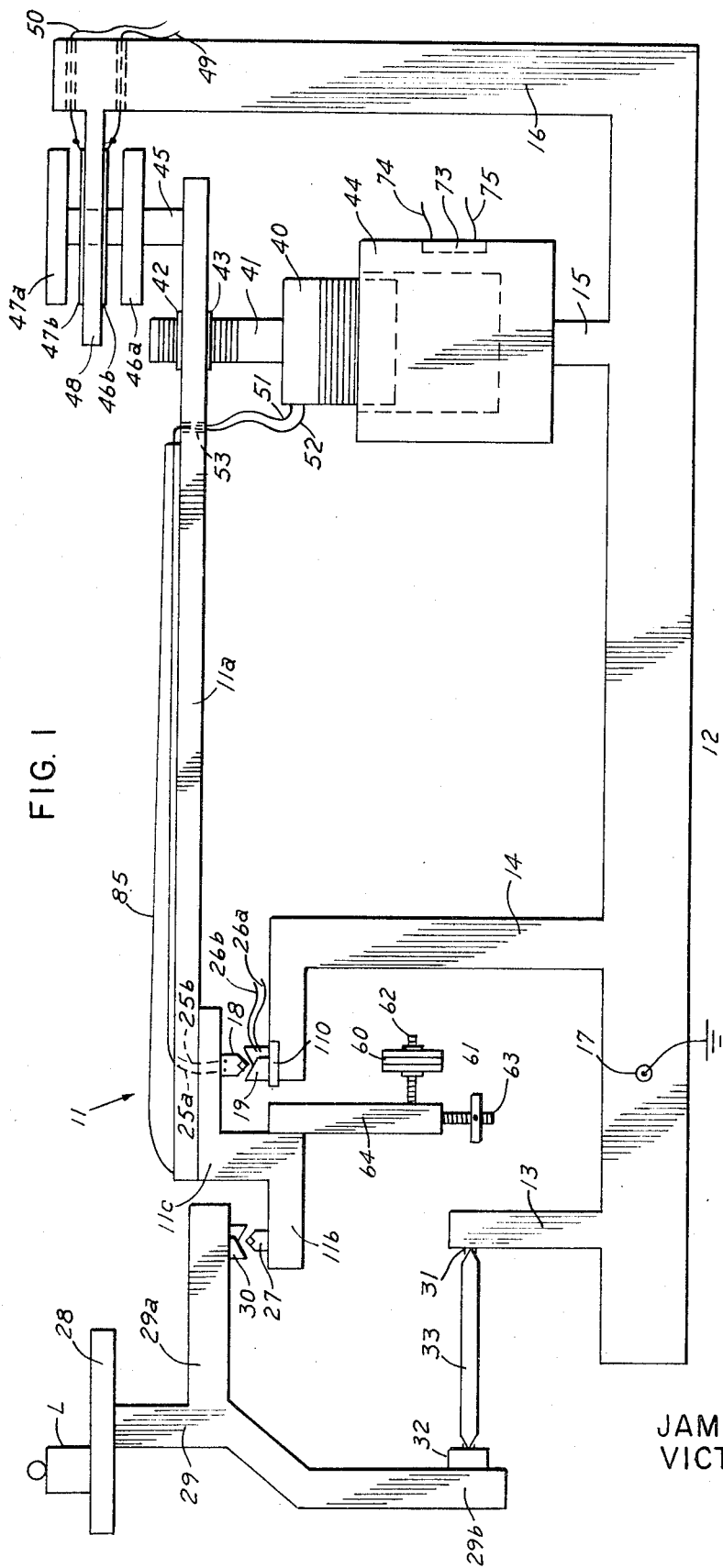
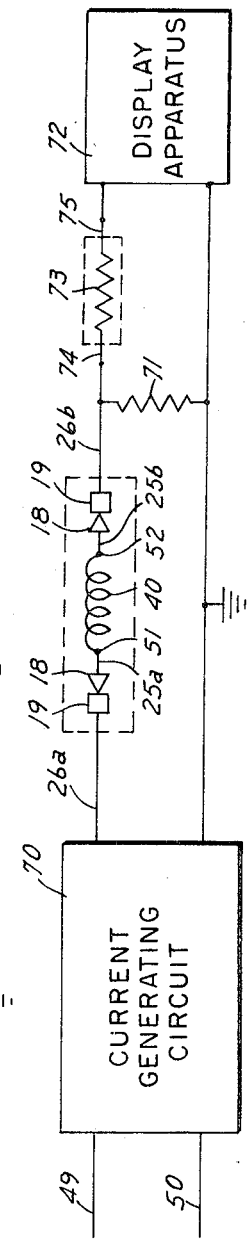

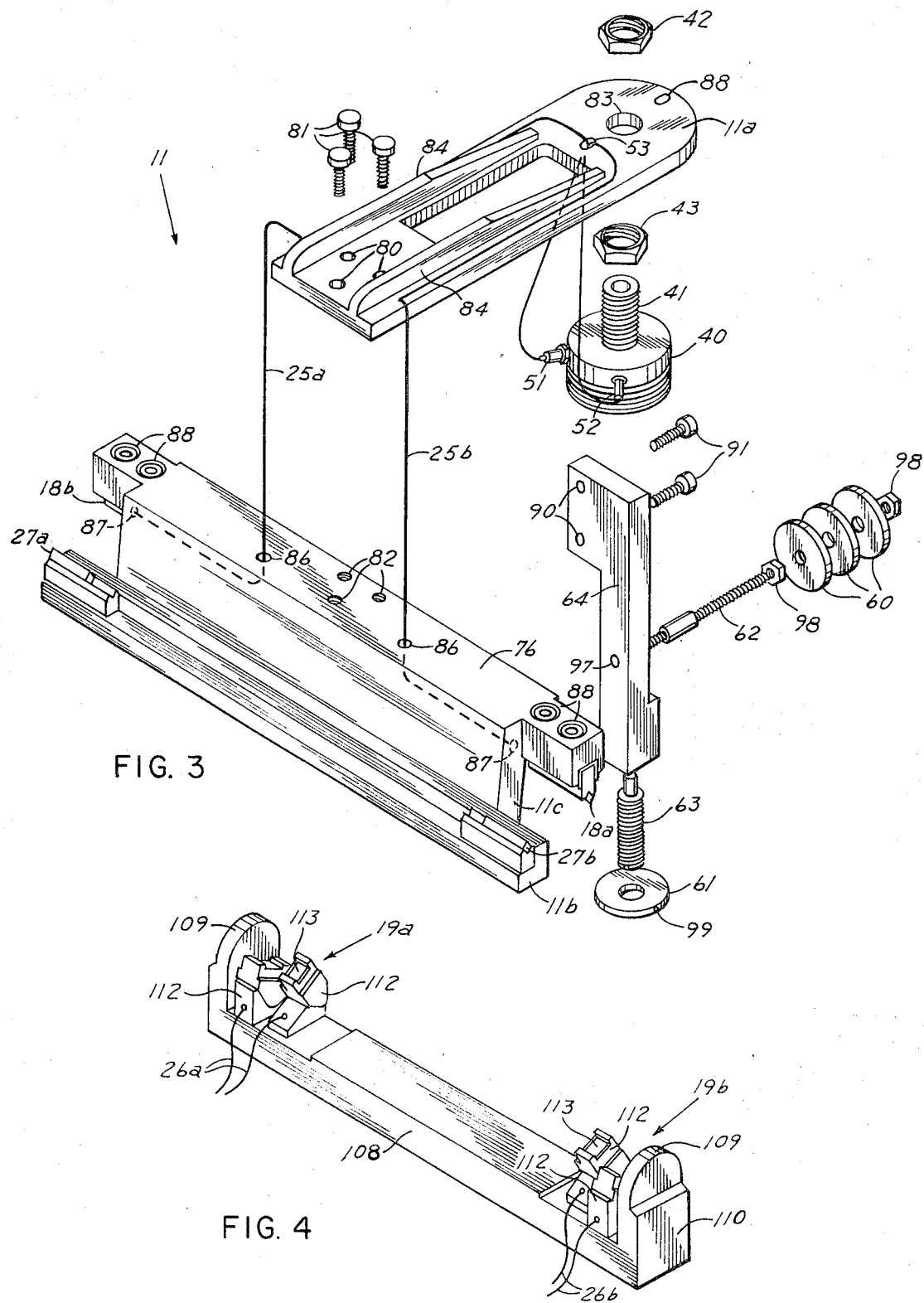

BALANCED MASS-MOMENT BALANCE BEAM WITH ELECTRICALLY CONDUCTIVE PIVOTS

The present invention relates to weighing apparatus and more particularly to an improved electronic beam balance type of weighing apparatus.

Heretofore, beam type weighing apparatus has been constructed including capacitive sensors to measure beam deflection, circuitry to generate a current as a function of beam displacement proportional to load on the balance beam, and a null restoring device associated with the balance beam, and driven by the current generated to restore the beam when deflected to its reference plane or null position. One such beam balance type weigh apparatus is shown in U.S. Pat. application for Automatic Top-loading Weigh Apparatus With Electronic Measuring and Recording Circuit, Ser. No. 850,397, now patent no. 3,604,525, filed Aug. 15, 1969, and assigned to the assignee of the present invention. In that weighting apparatus, a magnet associated with a forcer coil connected to the current generating circuitry has been used as the null restoring device to restore the beam to its reference plane. Generally, it has been found necessary to mount the relatively heavy magnet of the null restoring device on the balance beam while the forcer coil was mounted on the frame of the weighing apparatus in order to avoid errors resulting from dangling wires connected between the forcer coil and the current generating circuitry from the balance beam, since otherwise the wires will exert measurable forces on the balance beams.

Such a prior art weighing apparatus of the type shown in application Ser. No. 850,397 has the disadvantage of being extremely sensitive to tilt and vibration since the moments of the mass associated with the beam which are parallel to and above and below the plane of the beam are not balance and as a result, the beam acts as a pendulum about its pivot axis. For example, the beam type balance shown in application Ser. No. 850,397 has a vertical leg depending from its pivotally mounted balance beam with the relatively heavy magnet of its null restoring device together with its capacitive sensor and other supporting structure mounted on the vertical leg below the beam plane. Thus, a significant portion of the mass associated with the beam is located below the plane of the beam and the moment of mass parallel to and below the beam plane is greater than the moment of mass parallel to and above the beam plane. As a result, if the frame of the weighing apparatus is vibrated or tilted, for example, due to vibration or tilt of the table upon which the weighing apparatus is situated, the beam and its reference plane defined through its pivot axis are tilted out of the horizontal. Gravity forces however then act on the mass of the tilted beam distributed above and below the plane of the beam to create unbalanced forces above and below the beam which are parallel to the beam plane and create a torque. Due to this torque, the tilted beam is rotated away from its reference plane back to the horizontal where the vertical force gravity has no force components parallel with the horizontally aligned beam.

The realigning of the balance beam with the horizontal and out of its plane of reference due to gravity causes the movable capacitor plates which are carried on the balance beam to move relative to the frame mounted capacitor plates of the capacitive sensor out of their null position so as to cause a capacitance change. In response to the resultant change in capacitance of the capacitive sensor, the circuitry in the weighing apparatus generates an output which drives the null restoring device to restore the plane of the balance beam to the titled reference plane and the plates of the capacitive sensor are returned to their null position. This current signal which is generated to hold the balance beam in its tilted reference plane causes the weighing apparatus to generate a false readout and thus, error signals are introduced in the apparatus readout due to table tilt and vibration. Further, it has been found with such weighing apparatus that minimal changes in the tilt of the frame of the weighing apparatus caused appreciable variations in its output.

Accordingly, it is an object of the present invention to provide an improved electronic beam type weigh apparatus characterized by a balance beam mechanism which is weighted and arranged to nullify its pendular characteristics so as to be relatively insensitive to frame tilt and vibration.

It is a further object of the present invention to provide an improved electronic beam type weigh apparatus which is characterized by being relatively insensitive to frame tilt or vibrations and having null restoring means including a beam mounted forcer coil which is connected to external circuitry through electrical conductive pivots to avoid errors resulting from conducting wires connected from the forcer coil on the balance beam to the external circuitry.

It is an additional object of the present invention to provide an improved electronic beam type weigh apparatus characterized by being relatively insensitive to frame tilt or vibrations and having null restoring means including a beam mounted forcer coil which is connected to external circuitry through electrical conductive pivots to avoid errors resulting from conducting wires connected from the forcer coil on the balance beam to the external circuitry.

It is an additional object of the present invention to provide an improved electronic beam type weigh apparatus characterized by being relatively insensitive to frame tilt or vibrations, having increased weighing accuracy and being linearly responsive to load variations in restoring the apparatus to its null position.

It is also an object of the present invention to provide an improved electronic beam type of weigh apparatus having null restoring means including a beam mounted forcer coil and frame mounted magnet which interact to create a beam restoring force proportional to the forcer coil current while eliminating errors caused by frame tilt or vibration and dangling wires from the balance beam as well as compensating for errors resulting from temperature changes.

In accomplishing the above and other objects, there has been provided in accordance with the present invention a novel and improved weighing apparatus having a balance beam constructed and arranged to nullify its pendular characteristics. The beam is pivotally mounted on horizontally spaced, electrically conductive first knife-edged pivots and a weigh pan arrangement is pivotally mounted on second knife-edged pivots for transferring a load or weight to one side of the balance beam without error. Included is an electromagnetic null restoring device formed by a beam mounted forcer coil and frame mounted magnet. The position of the plane of the beam as defined through the edges of the first and second knife-edged pivots is monitored relative to a reference plane defined by the differential measurement of the capacitance between two beam mounted sensor plates and two frame mounted sensor plates, and a circuit generates an electrical output as a function of the beam displacement from its reference plane sensed by the sensor plates in proportion to the load on the weigh pan. The forcer coil is connected through the electrically conductive first knife-edged pivots to receive the circuit output, thereby to avoid direct connection of wires to the balance beam, and has its position relative to the magnet set so that the restoring device responds linearly to the circuit output.

The pendular characteristics of the balance beam are nullified by appropriately mounting and positioning the relatively light forcer coil, the beam mounted sensor plates, and other supporting structure on the balance beam together with adjustable counterweights to balance the moments of mass of the beam about its pivot axis. The moments of mass are balanced when the mass associated with the beam has been so distributed that the moments above and below the beam plane and parallel thereto are equated to counteract each other, and the moment of mass perpendicular to the beam plane on each side of the beam are similarly equated. With the pendular characteristics of the beam thus nullified, the beam has no tendency due to gravity to reposition itself whenever the beam is tilted away from the horizontal due to frame tilt or vibration since the moments of mass above and below the beam plane are equal. Thus, no current need be generated by the null restoring beam to hold the beam in its reference plane when tilted and no readout error is generated. Therefore, the weighing apparatus is relatively insensitive to frame tilt and vibration. Also included in the weighing apparatus is a display, such as a digital voltmeter, which receives the circuit output and is compensated by a thermistor physically mounted on the null restoring device for errors caused by changes in the response of the restoring device as a function of its operating temperature so that the display provides a compensated readout which represents load.

The above and other objects, advantages and features of the present invention will become more readily understood and appreciated from a consideration of the following detailed description of a preferred form thereof when taken together with the accompanying drawings, in which:

FIG. 1 is a side view schematically illustrating the preferred form of beam type balance according to the present invention.

FIG. 2 is a partial block, partial circuit diagram of electrical apparatus suitable for use with the beam balance of FIG. 1 to form a beam type of weighing apparatus according to the present invention.

FIG. 3 is an exploded perspective view of the balance beam mechanism of the beam balance of FIG. 1; and FIG. 4 is a perspective view of the pivot mounting for the beam of FIG. 3 in the beam balance of FIG. 1.

Referring to the drawings in more detail, there is shown in FIG. 1 a beam type of balance generally indicated by the numeral 10. As shown in FIG. 1, the balance 10 has a horizontally extending balance beam 11 with a horizontal leg portion 11a, a lower spaced, horizontal leg portion 11b connected to one end of portion 11a by a vertical intermediate portion 11c so that the leg portions 11a and 11b are in vertically spaced, parallel relation to one another. Accordingly, the beam leg portion 11c is preferably substantially perpendicular to the leg portions 11a and 11b. The balance 10 has a base frame 12 and mounted on the frame 12 are horizontally spaced uprights, from left to right 13, 14, 15 and 16 as viewed in FIG. 1. The frame 12 is electrically grounded at a terminal 17.

A horizontally extending portion of the upright 14 supports the balance beam 11 on a pair of knife-edged pivots 18 one of which is represented in the side view shown in FIG. 1. The knife-edged pivots 18, located on the underside of the beam 11 near the lefthand end of leg portion 11a, are pivotally mounted in V-shaped pivot mounts 19 secured by support structure 110 on the upright 14. For reasons hereinafter explained, the pivots 18 and pivot mounts 19 are preferably composed of graphite so as to be electrically conductive. Electrical leads 25a and 25b are each connected to one of the pivots 18, and electrical leads 26a and 26b are each connected to one of the pivot mounts 19.

Mounted on the free end of the beam leg portion 11b are a pair of upstanding knife-edged pivots 27, one of which is represented in the side view shown in FIG. 1. It is noted that the knife edges of the knife-edged pivots 18 and 27 are horizontally aligned to define the plane of the beam 11. A weigh pan 28 is supported on the upper end of a stirrup leg 29, the latter having a horizontally extending arm portion 29a spaced above the pivots 27. Mounted on the underside of the arm portion 29a are V-shaped mounting means or mounts 30 to pivotally engage the knife-edged pivots 27.

The stirrup leg 29 extends downwardly from its horizontal extension 29a and has a lower arm portion 29b which is preferably perpendicular to the horizontal extension 29a with its lower end portion adjacent to the upright 13. On the upper end of the upright 13 on the side facing the stirrup arm portion 29b is a mount 31, and a similar mount 32 is adjustable mounted on the arm portion 29b facing the mount 31 in a substantially horizontal line therewith. Seated in the mounts 31 and 32 is a rod or stabilizer member 33 having jeweled bearings on its ends for engaging the mounts 31 and 32. The rod 33, as hereinafter is explained, acts to hold or bias the stirrup arm 29b in an upright position so that whenever a load L, as represented in FIG. 1, is positioned on the balance pan 28, the resulting force applied to the beam leg 11 through the knife-edged pivots 27 is equal to the weight of the load L. In this way, errors are not introduced into the output of the balance 10 as a result of the location of the load L on the weigh pan 28.

A forcer coil 40 is mounted on the righthand end of the leg portion 11a preferably at a point directly over the upright 15. The coil 40 is mounted by inserting its upper cylindrical, threaded mounting portion 41 through an opening in the leg portion 11a. The cylindrical mounting portion 41 has its threaded end inserted through the opening in the leg portion 11a and is secured to the leg portion 11a by means of upper and lower lock nuts 42 and 43. The coil 40 is mounted on the leg 11 to hang or depend therefrom into the interior of an upwardly facing permanent magnet 44 which is mounted on the upright 15. As is hereinafter explained, the coil 40 is positioned with respect to the magnet 44 so that the electromagnetic null restoring means formed by the coil 40 and the permanent magnet 44 operates linearly. The permanent magnet 44 is preferably an Alinico magnet. The position of the forcer coil 40 with respect to the magnet 44 is set by loosening the nuts 42 and 43, properly positioning the forcer coil 40 with respect to the magnet 44 and then tightening the nuts 42 and 43 to hold the coil 40 in the desired position.

Mounted on the end of the leg portion 11a opposite to portion 11b is an upright, generally cylindrical member 45. Spaced capacitor plates or sensor elements 46a and 47a are mounted parallel to one another on opposite sides of a horizontal support member 48 which extends from the upright 16, the upright member 45 extending through a hole formed in the horizontal member 48, and the capacitor plates 46a and 47a are movable vertically with respect to the horizontal support member 48. Mounted on the lower and upper surfaces of the horizontal support member 48, respectively, are spaced parallel capacitor plates or sensor elements 46b and 47b, and electrical leads 49 and 50 are connected, respectively, to the capacitor plates 46b and 47b. The capacitor plates 46b and 47b form the fixed plates of a pair of capacitor sensors 46 and 47. The capacitive sensors 46 and 47 define the reference plane for the balance 10 about which the deflection of the balance beam 11 is measured. The reference plane for the beam 11 is the plane defined by the knife edges of the pivots 18 and 27 when the capacitive sensors 46 and 47 are in their null position, i.e., the movable plates 46a and 47a are so positioned by the beam 11 that the capacitance between the plates 46a and 46b equals the capacitance between the plates 47a and 47b. It is noted that the movable capacitor plates 47a and 46a are electrically grounded since they are physically connected to the balance frame 12 through the member 45.

Mounted also on the beam 11 is a preload counterweight 60 and a center of gravity counterweight 61. As shown in FIG. 1, the counterweights 60 and 61 are mounted, respectively, on threaded shafts 62 and 63 so that they are secured to the beam 11 by means of the downwardly extending arm 64 which depends from the leg portion 11c. The shafts 62 and 63 are mounted on the member 64 so that when the plane of the beam 11 is in the horizontal plane, the shafts 62 and 63 extend, respectively, substantially in horizontal and vertical planes. The positions of the weights 60 and 61 on the shafts 62 and 63 are set so as to appropriately distribute mass associated with the balance beam 11, thereby to nullify the pendular characteristics of the beam 11 about the pivot axis defined by the knife-edges of the pivots 18. The balance beam 11 is constructed and arranged by mounting the forcer coil 40, the movable capacitor plates 46a, 47a and other support structure on the balance beam 11 so that the moments of mass of the beam 11 about its pivot axis may be balanced by setting the positions of the weights 60 and 61. The position of the weight 60 is adjusted along the shaft 62 which runs parallel with the plane of the beam 11 defined by the knife edges of the pivots 18 and 27.

Thus, by positioning the weight 60 on the shafts 62 the moments of mass perpendicular to the beam plane on the right and left sides of the beam 11 may be balanced.

The position of weight 61 is adjustable along the shaft 63 which extends perpendicular to the beam plane defined the knife edges of the pivots 18 and 27. Therefore, by positioning the weight 61 on the shaft 63 the moment of mass parallel to and above the beam plane and due to the portion of the beam 11 above the beam plane, the movable capacitor plates 46a, 47a and other support structure above the beam plane may be balanced by an equal moment of mass below and parallel to the beam plane and due to the weights 60 and 61, at least a portion of the relatively light forcer coil 40 and supporting structure on the beam 11 below its beam plane. With the pendular characteristics of the beam 11 thus nullified, the unloaded beam 11 has no tendency due to gravity to reposition itself whenever the beam 11 and the plane of reference of the balance 10, as defined by the null position of the capacitors 46 and 47, are simultaneously tilted away from the horizontal due to tilt or vibration of the apparatus frame 12. Thus, as hereinafter explained, the balance 10 is relatively insensitive to tilt and vibration.

Referring to FIG. 2, the leads 49 and 50 from the fixed capacitor plates 46b and 47b are connected as inputs to a current generating circuit 70. The circuit 70 is a conventional type of circuit preferably such as that described and disclosed in the aforementioned U.S. Pat. application Ser. No. 850,397 and is operable to generate a DC current of appropriate sign and magnitude to excite and drive the forcer coil 40 so as to restore the balance beam 11 to its null position. The null position or reference plane for the beam, as earlier described, is the plane defined by the knife edge of the pivots 18 and 27 with relation to the frame mounted capacitor plates 46b and 47b in which the beam mounted capacitor plates 46a and 47a are so positioned by the beam 11 that the capacitance of the capacitive sensors 46 and 47 are equal. One output terminal of the current generating circuit 70 is connected through the lead 26a, one conductive pivot 18 and its associated mounting 19, and the lead 25a to a terminal 51 of the coil 40. The other terminal 52 of the forcer coil 40 is connected by the lead 25b, the other conductive pivot 18 and its associated mounting 19, and the lead 26b to one terminal of a reference resistor 71. The other terminal of the reference resistor 71 is connected in common with the other output terminal of a reference circuit 70 to ground. It is noted that the pivots 18, mounts 19, leads 25, terminals 51 and 52 and the coil 40 are shown enclosed in dashed lines in FIG. 2 to indicate that they are physically located on the beam balance 10 shown in FIG. 1.

The inputs of a display apparatus 72, preferably a digital voltmeter, are connected across the reference resistor 71 and a thermistor 73 is connected in series with the display apparatus 72. The thermistor 73 is shown enclosed in dashed lines in FIG. 2 to indicate that it is physically located in a slot cut in the casing of the permanent magnet 44. The electrical leads 74 and 75 are connected from the terminals of the reference resistor 71 common with the lead 26b and one input terminal of the display apparatus 72.

An important feature of the present invention resides in the construction of the beam balance mechanism as shown in FIG. 3. The leg portion 11a takes the form of an elongated, relatively flat member which has holes 80 at one end to receive screws 81 which are threaded into bores 82 formed in the upper surface of the mounting bar 76 for the pivots 18. A hole 88 is formed in the opposite end of the leg portion 11a, for mounting the upright cylindrical member 45 therein, the latter supporting the movable capacitor plates 46a and 47a.

An opening 83 is also formed inwardly of the hole 88 to receive the forcer coil 40 which is mounted by insertion of the threaded post 41 in the hole 83. The lock nuts 42 and 43 are positioned above and below the opening 83, respectively. Insulated leads 25a and 25b extend from the terminals 51 and 52 of the forcer coil 40 through an opening 53 along the sides of the ridges 84 and downwardly through openings 86 formed in the bar 76. The leads 25a and 25b are then connected at points designated 87 to the knife-edged pivots 18a and 18b, pivots 18 being fastened to the bar by screws designated 88. The Knife-edged pivots 18a and 18b are preferably composed of carbide so as to be electrically conductive and are insulated from the frame structure of the beam 11. Extending downwardly from one side of the bar 76 is the intermediate vertical portion 11c of the beam 11 which is connected to the beam portion 11b. The portion 11b is substantially rectangular member which extends parallel to the bar 76 and has mounted on its upper surface the upwardly facing knife-edged pivots 27a and 27b.

The counterweight support member 64 is shown in FIG. 3 with screw holes 90 through which screws 91 are inserted to mount the member 64 centrally on the side of the beam portion 11c opposite to beam portion 11b. The weight 60 may be formed by a group of weights which are mounted on the threaded shaft 62 by means of lock nuts 98, and shaft 62 is threaded into a hole 97 formed in the side of the member 64. The weight 61 is held in position on its threaded shaft 63 by tightening a screw 99 in the side of the weight 61. The shaft 63 is mounted on the member 64 by screwing it into a hole in the bottom of the member 64.

There is illustrated in FIG. 4 the support bar 108 for pivot mounts 19a and 19b, the bar having a flat rectangular end portion 110 with upright end portions 109 at opposite ends thereof. The pivot mounts 19 are each defined by appropriately inclined bearing flats 113 to form a V-shaped assembly at opposite ends of the bar 108, each flat mounted on inclined support blocks 112. The bearing flats 113 also are preferably composed of carbide and are insulated from the blocks 112 and the mounting structure 108 but are connected to ends of the leads 26a and 26b as shown.

Prior to using the beam balance 10, the preload weight 60 and the counterweight 61 are selectively positioned on the shafts 62 and 63 to balance the beam 11 in its reference plane so that the capacitive sensors 46 and 47 are in their null position and nullify its pendular characteristics about its pivot axis defined by the knife-edged pivots 18. As before described, the weight 60 is positioned on the shaft 62 which is parallel to the beam plane defined by the knife edges of pivots 18 and 27 to balance the moments of mass perpendicular to the beam plane on each side of its pivot axis. At the same time, the weight 61 is positioned along shaft 63 which is perpendicular to the beam plane to balance the moments of mass above and below the beam plane. With the weights 60 and 61 so adjusted the pendular characteristics of the beam 11 are nullified and thus the beam balance 10 is not sensitive to frame tilt in its unloaded condition since the sum of torque exerted due to gravity forces on the beam 11 is always zero regardless of the angle of tilt of the unloaded beam 11, the frame 12, and the reference plane established by the frame mounted capacitor plates 46b and 47b. Thus, there is no tendency for the beam 11 to move in a pendulous manner about its pivot axis defined by the knife-edged pivots 18 whenever the frame 12 is tilted or vibrated relative to the horizontal and no current need be supplied to the forcer coil 40 to maintain the beam 11 in its reference plane, even when its reference plane is tilted to the horizontal.

At the same time or prior to the adjustment of the weights 60 and 61, the adjustable mount 32 is adjusted so as to set the effective length of the stabilizer rod 33 such that the rod 33 maintains the stirrup portion 29b in an upright or vertical plane. The term "effective length of the rod 33" is here defined as the length as set by the rod 33 of a perpendicular drawn from the upright 13 to the stirrup portion 29b. With the beam 29b biased vertically, any load placed on the weigh pan 28 is transmitted accurately as a downward force through the knife edges of the pivots 27 to the beam 11. Thus, the load L may be placed at any point on the weigh pan 28 since the same force equal to the load L is always transmitted by the horizontally biased stirrup extension 29a to the knife-edged pivots 27. Any lateral force component which the load L attempts to exert on the stirrup 29 is cancelled by the biasing force of the rod 33 against the lower arm 29b of the stirrup 29. With the stabilizer rod 33 and the weights 60 and 61 properly positioned, the beam balance 10 is ready for operation.

In operation, a load L is placed on the weigh pan 28. A force equal to the weight of the load L is transmitted by the stirrup portion 29a and the mounting means 30 to the knife edges of the pivots 27. As a result, the beam portion 11b is deflected in a downward direction and the free end portion 11a of the beam 11 moves upwardly. Thus, the beam mounted sensor plates 46a and 47a are moved from their null position and the capacitance of the capacitors 46 and 47 formed by the capacitor plates 46a, 46b and 47a, 47b is changed. The changes in capacitance are transmitted over leads 49 and 50 as a differential capacitive signal to the current generated circuit 70. The operation of the current generating circuit 70 is described in detail in the before-mentioned patent application Ser. No. 850,397 and the circuit 70 generates a DC circuit current of an appropriate sign and magnitude for driving the null restoring means provided by the forcer coil 40 and the permanent magnet 44.

The output current of the current generating circuit 70 flows through the forcer coil 40 via the knife-edge pivots 18 and their associated mounts 19 and excites the forcer coil 40 and the reference resistor 71. The coil 40 is excited to drive the null restoring means and a DC voltage representative of the load L on the weigh pan 28 is generated across the resistor 71 which voltage is transmitted to the display apparatus 72. By means of the lock nuts 42 and 43, the forcer coil 40 is set in an appropriate position vertically with respect to the permanent magnet 44 so that the response of the null restoring means to the DC output of the circuit 70 is substantially linear.

With regard to the linearity of response of the null restoring means provided by a forcer coil and magnet, a study was conducted which found that non-linearity was due to internal/external fringing of the electrical lines of force of the forcer coil with respect to the magnet. For example, if the forcer coil 40 on the beam 11 is initially positioned in its reference position near the upper edge of the magnet 44, it would be found that the unbalance of the internal/external fringing would tend to magnetize the magnet 44 so that the current necessary in the forcer coil 40 to restore the beam 11 to its reference plane would be proportionately smaller than the larger beam displacement. The converse is found to be true if the forcer coil 40 is positioned in its initial reference position too far within the magnet 44. Thus, it was concluded that by making the position of the forcer coil 40 adjustable with respect to the magnet 44, their relative positions may be set so as to make the response to the null restoring means substantially linear about its reference position. The reference position for the null restoring means is its position when the plane of the beam 11 is positioned in the reference plane at which the capacitances of the capacitor sensors 46 and 47 are equal.

The display apparatus 72 which is preferably a digital voltmeter measures the voltage generated across the reference resistor 71 and converts this voltage into a digital readout which represents the load L on the weigh pan 28. It has been found, however, that as such a weighing apparatus is used over a period of time and current is continuously supplied to the forcer coil 40 that the voltage generated across the reference resistor 71, and thus the readout displayed by the display apparatus 72, gradually increases. The reason for this gradual increase or so-called temperature drift has been traced to the fact that the flux density of the null restoring means provided by the forcer coil 40 and the permanent magnet 44 changes due to changes in the reluctance of their magnetic path as a function of the operation temperature of the null restoring means.

Such a change in the reluctance occurs because heat radiated by the forcer coil 40 causes the magnet 44 which is larger in diameter than the pole face of the forcer coil 40 to expand more than the forcer coil 40. Thus, the air gap between the magnet 44 and the coil 40 changes causing a change in reluctance of the null restoring means. Therefore, the magnetic flux density of the null restoring means changes and this causes an upward drift in the readings of the display apparatus 72.

In order to compensate for this temperature drift, the thermistor 73 is mounted in the casing of the magnet 44. The thermistor 73 which has a positive temperature-resistance coefficient is connected in series with one input of the display apparatus 72 and operates as a temperature sensing means to reduce the sensitivity of the display apparatus 72 as the temperature of the magnet 44 increases. Accordingly, the readout of the display apparatus 72 is compensated for temperature changes and the display apparatus 72 operates to display an accurate indication of the load L on the weigh pan 28.

Thus, there has been provided a beam type of weighing apparatus which is operable to weigh a load placed on its weigh pan by generating an electric current proportional to the load. The balance is arranged to have the forcer coil mounted on a horizontally extending balance beam and the beam is weighted to nullify its pendular characteristics. It is noted that while the weight 61 which balances the moments of mass parallel to the plane of the beam 11 is placed below the pivot axis of the exemplary apparatus that depending on how the mass associated with the beam is distributed above and below the beam the weight 61 may need to be placed above the beam's pivot axis. As a result, the weighing apparatus even when weighing a load, is relatively insensitive to frame tilt and vibration, on the order of 6,000 times less sensitive than the aforementioned prior art weighing apparatus. Further, electrically conductive pivots are provided so that the forcer coil may be connected to external electrical circuitry without dangling or connecting wires from the balance beam. Wires on the balance beam which are connected to external circuitry may not be used in extremely sensitive balances since they exert measurable forces on the balance beam. Prior art weighing apparatuses had mounted the magnet, instead of the forcer coil, on the balance beam, and made the balance beams extremely sensitive to frame tilt due to the unbalance of the moments of mass parallel to and above and below the beam plane.

Additionally, a weigh pan arrangement is provided wherein the pan is mounted on a vertically biased stirrup so that the resultant force transferred by a horizontal extension of the stirrup to the balance beam is equal to the load placed on the weigh pan. A load may be placed at any location on the pan and the weigh pan arrangement is operable to accurately transmit a force representing this load to the beam leg. Further, the positions of the forcer coil and its permanent magnet are adjustable with respect to each other so that they may be preset to have a linear response. Also, a thermistor is mounted in the casing of the permanent magnet of the null restoring means so that the readout of the display apparatus is compensated for errors caused by changes in the reluctance of the null restoring means due to heating of the magnet.

It is therefore to be understood that the foregoing description of the present invention is of a preferred embodiment only, and it will be apparent to those skilled in the art that various modifications may be made therein without departing from the invention.

What is claimed is:

1. In an electronic balance, a beam type weighing apparatus comprising
  a frame,
  a horizontally extending beam pivotally mounted on said frame by electrically conductive pivot means and having a beam plane extending horizontally through its pivot axis whereby loads weighed by said weighing apparatus are measured as a function of the displacement vertically of said beam from its reference plane, and said balance beam having the mass associated therewith selectively distributed to balance the moments of mass parallel and perpendicular to said beam plane whereby to substantially eliminate the pendular characteristics of said balance beam so as to be relatively insensitive to tilt and vibration of said frame, sensor means including frame-mounted sensor elements and beam mounted sensor elements to indicate the displacement of said beam relative to said beam reference plane and to generate an electrical signal representative of beam displacement whereby variations in the load weighed by said weighing apparatus are measured, circuit means associated with said frame mounted sensor elements and said beam mounted sensor elements to receive the electrical signal generated to develop an electrical output proportional to the load being weighed by said weighing apparatus, and electromagnetic null restoring means associated with said balance beam and electrically connected to said circuit means through said electrically conductive pivot means, said null restoring means being operative to restore said beam to its original disposition with respect to its reference plane in response to the electrical output generated by said circuit means.

2. The invention recited in claim 1, wherein said null restoring means includes a forcer coil and a magnet mounted in said weighing apparatus to be movable relative to each other by pivotal movement of said balance beam, said forcer coil being connected to said circuit means and including means for selectively setting the relative positions of said forcer coil and said magnet with respect to each other about which said forcer coil and said magnet are moved relative to each other by pivotal movement of said balance beam so that said null restoring means has a substantially linear response to said electrical output.

3. The invention recited in claim 1, wherein said null restoring means includes a forcer coil and a magnet, said forcer coil mounted on said balance beam and said magnet mounted on said frame to interact with said forcer coil, said forcer coil positioned relative to said magnet by pivotal movement of said balance beam, and wherein said balance beam is pivotally connected on said frame by electrically conductive pivot means, said forcer coil being electrically connected to said circuit means through said electrical conductive pivot means.

4. The invention recited in claim 3, wherein said electrically conductive pivot means are comprised of carbide knife-edged pivots and carbide bearing flats.

5. The invention recited in claim 3, including means for selectively setting the position of said beam mounted forcer coil with respect to said magnet about which said forcer coil is pivotally moved by said balance beam so that said null restoring means has a substantially linear response to said electrical output.

6. The invention recited in claim 1 wherein said null restoring means includes a forcer coil and a magnet mounted in said weighing apparatus to be movable relative to each other by pivotal movement of said balance beam, said forcer coil being connected to said circuit means and including a temperature sensing means mounted on said null restoring means to sense its operating temperature, said temperature sensing means connected to said circuit means and being operable to compensate for error in said electrical output due to changes in response of said null restoring means to said electrical output as a result of changes in the operating temperature of said null restoring means.

7. The invention recited in claim 6, wherein said circuit means and said temperature sensing means are connected in series to receive said electrical output of said circuit means and the resistance of said temperature sensing means is proportional to its temperature.

8. The invention recited in claim 1, including:

downwardly facing first knife-edged pivot means mounted on said balance beam, said balance beam being pivotally mounted on said frame by said first knife-edged pivot means, upwardly facing second knife-edged pivot means mounted on said balance beam, the knife edges of said first and second pivot means being aligned to define said beam reference plane, a weigh pan for supporting a load to be weighed including structure pivotally mounting said weigh pan on the knife edges of said second pivot means, said structure including first and second arms which are perpendicular to each other, said first arm positioned to rest on the knife edges of said second pivot means, and means for vertically supporting said second arm, said support means being selectively adjustable to bias said second arm in a substantially vertical plane whereby said first arm is maintained in a substantially horizontal plane and a load placed at any location on said weigh pan is transmitted without error to said balance beam at the knife edges of said second pivot means through said first arm portion.

9. The invention recited in claim 8 wherein said support means includes:

an upright member mounted on said frame, a stabilizer member positioned between said second arm portion and said upright member to vertically stabilize said second arm portion, and first and second mount means mounted, respectively, on said second arm portion and said upright member for receiving said stabilizer member, at least one of said mount means being adjustable so that the effective length of said stabilizer member between said upright and second arm portion may be adjusted to bias said second arm portion in a substantially vertical plane.

10. The invention recited in claim 1, including:

first counterweight means mounted on said balance beam for selective positioning perpendicular to said beam plane whereby the moments of mass parallel to said beam plane are balanced by selectively positioning said first counterweight means, and second counterweight means mounted on said balance beam for selective positioning parallel to said beam plane whereby the moments of mass perpendicular to said beam plane are balanced by selectively positioning said second counterweight means.

11. In an electronic balance, a beam type weighing apparatus wherein a balance beam pivotally mounted on a frame has a beam reference plane which extends through its pivot axis to indicate beam position, and a load weighed by said weighing apparatus is measured as a function of the displacement of said beam plane as indicated by beam mounted sensors from a reference plane defined by frame mounted sensors, and an electrical output is generated proportionately to the load being weighed, the improvement comprising:

a null-restoring device including a beam mounted forcer coil being excited by said electrical output to restore said balance beam to its null position with respect to the beam reference plane, and electrically conductive pivot means mounting said balance beam on said frame, said forcer coil being electrically connected to said electrically conductive pivot means to receive the electrical output generated in response to displacement of said balance beam.

12. The invention recited in claim 11, wherein said electrically conductive pivot means are comprised of carbide knife-edged pivots and carbide bearing flats.

13. The invention recited in claim 11 wherein said balance beam has the mass associated therewith selectively distributed to balance the moments of mass parallel and perpendicular to said beam plane whereby to substantially eliminate the pendular characteristics of said balance beam so that said weighing apparatus is relatively insensitive to tilt and vibration.

14. In a beam type weighing apparatus wherein a balance beam pivotally mounted on a frame has a beam plane defined which extends through its pivot axis to indicate beam position and loads weighed by said weighing apparatus are measured as a function of the displacement of said balance beam from the reference plane, the improvement comprising:

capacitive sensor means including frame mounted capacitor plates and beam mounted capacitor plates which indicate the position of said beam plane relative to said reference plane, said capacitive sensor means being operable to measure the displacement of said beam plane from said reference plane and generate an electrical signal representative of beam displacement whereby variations in the load weighed by said weighing apparatus are measured, circuit means associated with said frame mounted capacitor plates to receive the electrical signal for generating an electrical output proportional to the load being weighed by said weighing apparatus, first electrically conductive pivot means mounting said balance beam on said frame, null restoring means including a forcer coil and a magnet for positioning and setting said balance beam to restore said beam plane in line with said reference plane in response to said electrical output generated by said circuit means, said forcer coil being mounted on said balance beam and connected through said electrically conductive pivot means to said circuit means, said magnet being mounted on said frame to interact with said forcer coil, said forcer coil being positioned relative to said magnet by pivotal movement of said balance beam, and said balance beam having the mass associated therewith selectively distributed to balance the moments of mass parallel and perpendicular to said beam plane whereby to substantially eliminate pendular characteristics of said balance beam so that said weighing apparatus is relatively insensitive to tilt and vibration.

15. The invention recited in claim 14, including means for selectively setting the position of said beam mounted forcer coil with respect to said magnet about which said forcer coil is pivotally moved by said balance beam so that said null restoring means has a substantially linear response to said electrical output.

* * * * *